(12) United States Patent
Heher et al.

(10) Patent No.: US 11,674,431 B2
(45) Date of Patent: Jun. 13, 2023

(54) PISTON COOLING JET

(71) Applicant: Transportation IP Holdings, LLC, Norwalk, CT (US)

(72) Inventors: Brett Heher, Pittsburgh, PA (US); Mahantesh Mallappa Hosur, Bangalore (IN); Krishnamurthy Vaidyanathan, Bangalore (IN); Kevin Paul Bailey, Mercer, PA (US); Sudeep Pradhan Sadananda Rao, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/369,400

(22) Filed: Jul. 7, 2021

(65) Prior Publication Data

US 2022/0010718 A1    Jan. 13, 2022

Related U.S. Application Data

(60) Provisional application No. 63/049,368, filed on Jul. 8, 2020.

(51) Int. Cl.
*F01P 3/08* (2006.01)
*F01P 3/06* (2006.01)

(52) U.S. Cl.
CPC ..................... *F01P 3/06* (2013.01)

(58) Field of Classification Search
CPC .......... F01P 3/08; F01P 2003/006; F01P 3/06; F01M 1/08
See application file for complete search history.

(56) References Cited

U.S. PATENT DOCUMENTS

| | | | | |
|---|---|---|---|---|
| 4,408,575 A | * | 10/1983 | Clairmont, Jr. | ........... F01P 3/10 123/41.35 |
| 4,979,473 A | * | 12/1990 | Lee | .......................... F01P 3/08 123/41.35 |

(Continued)

FOREIGN PATENT DOCUMENTS

| | | |
|---|---|---|
| EP | 2233232 A1 | 9/2010 |
| GN | 107201943 A | 9/2017 |

(Continued)

OTHER PUBLICATIONS

English translation of Office Action for related Eurasian Patent Application No. 202191577 dated Apr. 11, 2022 (2 pages).

(Continued)

*Primary Examiner* — Long T Tran
(74) *Attorney, Agent, or Firm* — The Small Patent Law Group LLC; Josef L. Hoffmann

(57) ABSTRACT

A piston cooling jet is provided that may include a housing having an interior chamber that receives a fluid from an external source, and a conduit coupled with the housing and fluidly coupled with the interior chamber, the conduit having a bent shape to direct the fluid from the interior chamber of the housing toward an underside of an engine piston head. The piston cooling jet may also include a flow straightening nozzle coupled with the conduit and positioned to straighten flow of the fluid exiting from the conduit via the nozzle toward the underside of the engine piston head, the flow straightening nozzle having internal intersecting walls that intersect along a direction of the flow of the fluid in the conduit and out of the flow straightening nozzle.

20 Claims, 5 Drawing Sheets

(56) References Cited

U.S. PATENT DOCUMENTS

| | | | | |
|---|---|---|---|---|
| 4,995,346 | A * | 2/1991 | Hudson, Jr. | F01P 3/08 123/41.35 |
| 5,948,549 | A | 9/1999 | Takayama et al. | |
| 2004/0031737 | A1 * | 2/2004 | Evans | B01D 29/96 210/167.02 |
| 2007/0108315 | A1 * | 5/2007 | Gehrig | F01P 3/08 239/492 |
| 2010/0001103 | A1 * | 1/2010 | Neto | F01M 1/08 123/41.42 |
| 2010/0031917 | A1 * | 2/2010 | Abe | F01M 1/08 123/196 R |
| 2016/0290188 | A1 * | 10/2016 | Gokan | F01M 1/08 |
| 2017/0130639 | A1 * | 5/2017 | Candela | F01P 3/08 |
| 2018/0126405 | A1 * | 5/2018 | Ogino | F01M 1/08 |
| 2018/0306096 | A1 * | 10/2018 | Shishido | F01M 1/08 |
| 2019/0178146 | A1 * | 6/2019 | Park | F01P 3/08 |
| 2019/0186309 | A1 | 6/2019 | Malischewski et al. | |
| 2020/0018008 | A1 | 6/2020 | Richard | |

FOREIGN PATENT DOCUMENTS

| | | |
|---|---|---|
| JP | 2004300511 A | 10/2004 |
| RU | 2624685 C1 | 7/2017 |
| SU | 973900 A1 | 11/1982 |

OTHER PUBLICATIONS

Office Action for related Eurasian Patent Application No. 202191577 dated Apr. 11, 2022 (2 pages).

English translation of Search Report for related Eurasian Patent Application No. 202191577 dated Feb. 18, 2022 (1 page).

Search Report for related Eurasian Patent Application No. 202191577 dated Feb. 18, 2022 (3 pages).

Search Report for related Eurasian Patent Application No. 202191576 dated Nov. 17, 2021 (4 pages).

Office Action for related Eurasian Patent Application No. 202191577 dated Nov. 9, 2022 (4 pages).

* cited by examiner

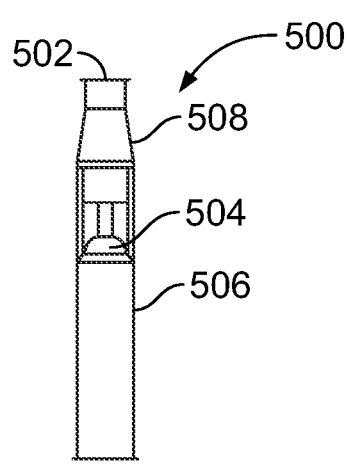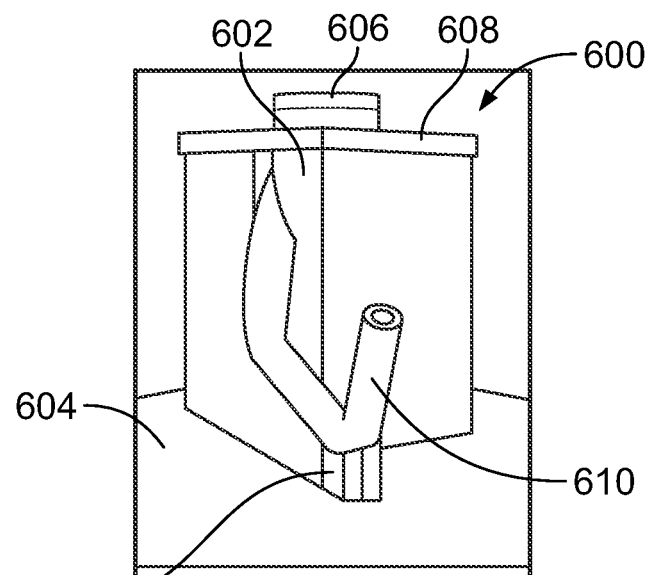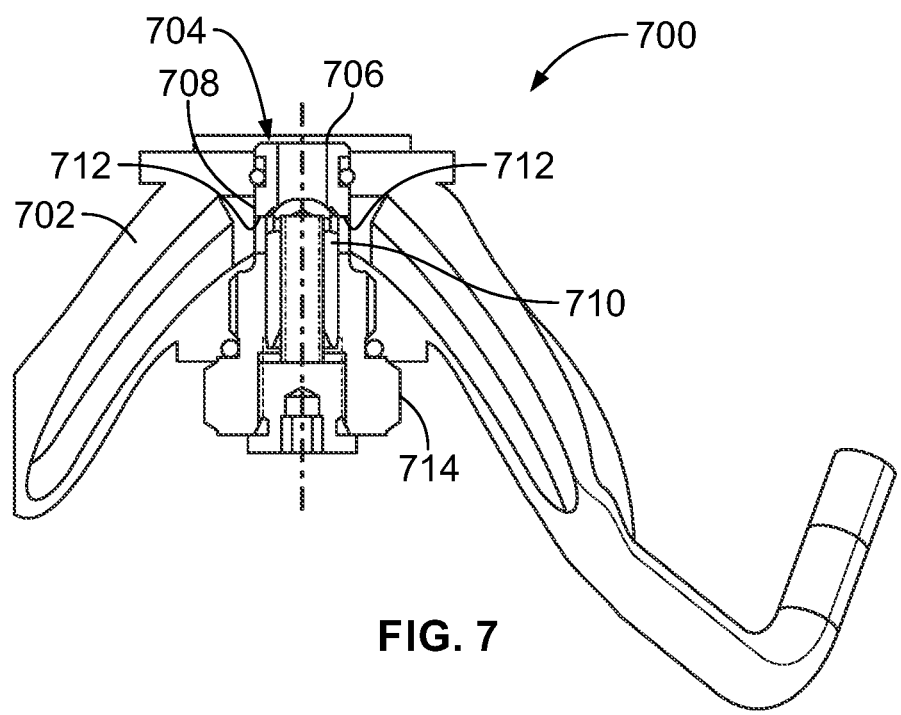

PISTON COOLING JET

CROSS-REFERENCE TO RELATED APPLICATIONS

This application claim priority to U.S. Provisional Application No. 63/049,368 entitled Piston Cooling Jet filed Jul. 8, 2020, hereby incorporated by reference herein.

BACKGROUND

Technical Field

The subject matter described relates to a piston cooling jet.

Discussion of Art

For an internal combustion engine, a piston cooling jet carries oil from the engine cylinder block to the piston head. The oil is directed towards the piston via the piston cooling jet. The piston cooling jet must jet, or spray oil into the piston head cavity through the full stroke of the piston. At the same time, the piston cooling jet must maintain adequate clearance to the piston head. The location of the engine cylinder block in relation to the piston head determines the required geometry for the piston cooling jet. In some cases, cylinder block and piston designs require the piston cooling jet geometry to be very complex.

Because of the complexity of the geometry, typical manufacturing methods for the internal combustion engine are similarly complex. Often a piston cooling jet assembly is provided with numerous individual components, and brazing, or press fit, must be undertaken to couple the components and accomplish the complexity desired. However, the brazing process can add time, and expense to the manufacturing process. In addition, ideal geometries to provide the cooling jet fluid continue to be difficult to achieve, and brazed components tend to deform easily as a result of lower material strength. As a result of the deformation, the jet orientation may be altered, causing oil jet deviation. The oil jet deviation ultimately results in not hitting the target hole in the piston reducing, if not eliminating the advantages of using the cooling fluid. It may be desirable to have a system and method that differs from those that are currently available.

BRIEF DESCRIPTION

In one or more embodiments, a piston cooling jet is provided that may include a housing having an interior chamber that receives a fluid from an external source, and a conduit coupled with the housing and fluidly coupled with the interior chamber, the conduit having a bent shape to direct the fluid from the interior chamber of the housing toward an underside of an engine piston head. The piston cooling jet assembly may also include a flow straightening nozzle coupled with the conduit and positioned to straighten flow of the fluid exiting from the conduit via the nozzle toward the underside of the engine piston head, the flow straightening nozzle having internal intersecting walls that intersect along a direction of the flow of the fluid in the conduit and out of the flow straightening nozzle.

In one or more embodiments, piston cooling jet is provided that may include a single body housing and conduit. The housing may have an interior chamber that receives a fluid from an external source, and the conduit may be coupled with the housing and fluidly coupled with the interior chamber. The conduit may have a bent shape to direct the fluid from the interior chamber of the housing toward an underside of an engine piston head. The piston cooling jet may also include a nozzle coupled with the conduit and positioned to direct flow of the fluid exiting from the conduit via the nozzle toward the underside of the engine piston head.

In one or more embodiments, piston cooling jet is provided that may include a single body housing and conduit. The housing may have an interior chamber that receives a fluid from an external source, and the conduit may be coupled with the housing and fluidly coupled with the interior chamber. The conduit may have a bent shape to direct the fluid from the interior chamber of the housing toward an underside of an engine piston head. The piston cooling jet may also include a nozzle coupled with the conduit and positioned to direct flow of the fluid exiting from the conduit via the nozzle toward the underside of the engine piston head.

In one or more embodiments, a method may be provided for depositing a first layer of material for a piston cooling jet onto a build plate, the piston jet including a housing and an elongated conduit. The housing may have an inlet and an interior chamber into which a fluid is received via the inlet, and the conduit may have a channel that is fluidly coupled with the interior chamber of the housing and that extends to a nozzle through which the fluid is directed out of the piston cooling jet. The method may also include depositing successive layers of the material onto the first layer to additively form the piston cooling jet. The first layer and the successive layers of the material may be deposited to form the conduit projecting from the housing at a downward angle toward the build plate and having a bend that angles the nozzle at an upward angle away from the build plate. The first layer and the successive layers of the material may be deposited to form vertical supports between the conduit and the build plate.

BRIEF DESCRIPTION OF THE DRAWINGS

The inventive subject matter may be understood from reading the following description of non-limiting embodiments, with reference to the attached drawings, wherein below:

FIG. 5 illustrates a sectional view of a nozzle of a piston cooling jet;

FIG. 6 illustrates a perspective view of a piston cooling jet on a build plate;

FIG. 7 illustrates a sectional view of a piston cooling jet;

DETAILED DESCRIPTION

Embodiments of the subject matter described herein relate to a piston cooling jet that may be formed by an additive manufacturing process. By utilizing the additive manufacturing process, a bent shape may be placed in a conduit to direct cooling fluid from an interior chamber of the housing to the underside of the head of a piston. In using the additive manufacturing process, a first layer of material may be deposited onto a build plate, and successive layers of materials may then be deposited onto the first layer. By using the additive manufacturing process the complexity of manufacturing and expense is reduced accordingly, while strengthening the piston cooling jet against deformation and wear.

Figure 1:
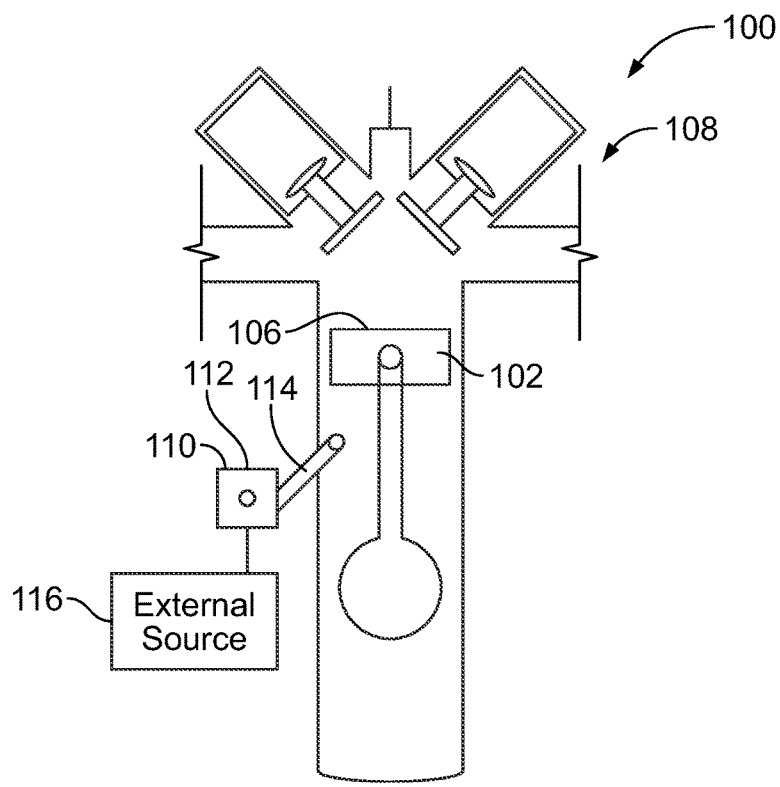
FIG. 1 illustrates a schematic view of an engine.

FIG. 1 illustrates a schematic block diagram of an engine 100. The engine may be an internal combustion engine used to drive a vehicle. The engine may be configured for use in a rail vehicle, off-road vehicle, automobile, aircraft, truck, mining or industrial vehicle, or the like. The engine may include at least one piston 102 within a piston chamber, or cylinder 104. Plural pistons, each in an individual chamber, are provided. The piston may have a piston head 106 that receives fuel within an engine cylinder block 108. The fuel explodes within the engine cylinder block, pushing the piston downward to provide work. A piston cooling jet 110 is provided that may include a housing 112 with at least one channel, or conduit 114 that extends therefrom into the piston cylinder underneath the piston head. The piston cooling jet may include a valve that receives thermal management fluid under pressure from an external source 116. The thermal management fluid may be any fluid that decreases or varies the temperature within the piston cylinder when supplied during operation of the piston. In one example, the thermal management fluid may be cooling fluid. The fluid may be a liquid, a gas, a liquid and gas mixture, high pressure liquid, high pressure gas, oil based, etc. In one example, the valve is a check valve that includes a spring that biases a ball against the piston cooling jet housing to close an inlet. When the spring force is overcome, the ball moves to allow cooling fluid to flow through the inlet into the interior chamber of the piston cooling jet to the channels to be conveyed against the underside of the piston head. In this manner, a technical effect of cooling and/or lubrication of the piston may be accomplished by using the piston cooling jet.

Figure 2:
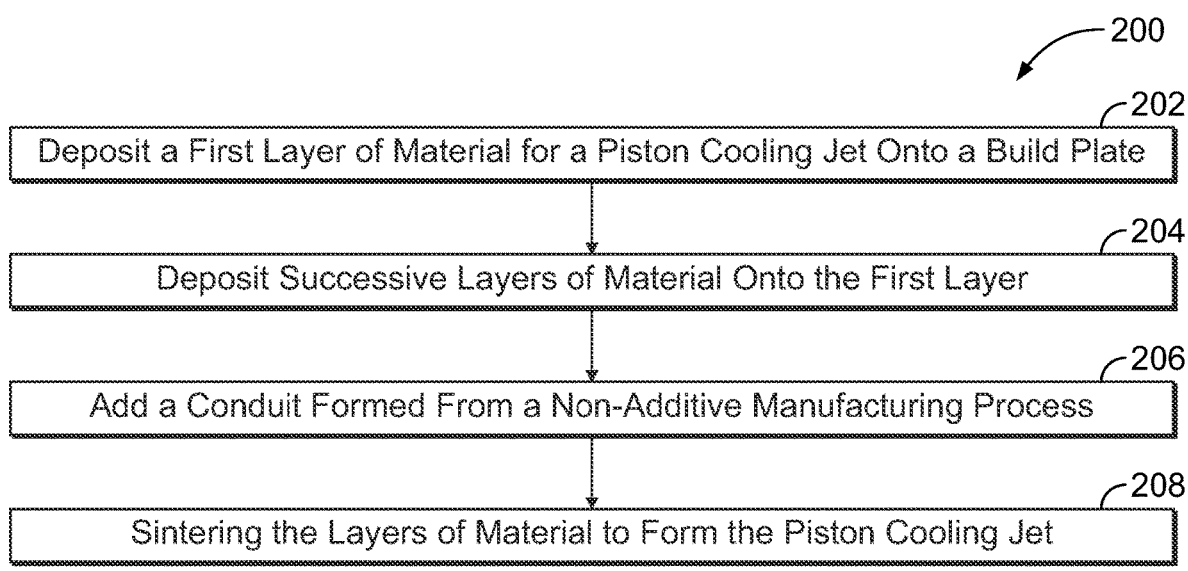
FIG. 2 illustrates a schematic process diagram of a process for manufacturing a piston cooling jet.

FIG. 2 illustrates a method 200 for manufacturing a piston cooling jet. The piston cooling jet may be the piston cooling jet described in FIG. 1 and may be provided for directing temperature controlled fluid to the underside of a piston within a piston cylinder during operation of an engine. The piston cooling jet may include a housing with a valve therein for receiving the temperature controlled fluid, and channels, or conduits, that deliver the fluid into a piston chamber underneath the piston head. The channels when formed include bending or arcuate portions to maintain adequate clearance from the piston, though the exact shape may be dependent on the location of the engine cylinder block in relation to the piston head to maintain adequate clearance to the piston head.

At 202, a first layer of material for a piston cooling jet is deposited onto a build plate. In one embodiment, the first layer is deposited through an additive manufacturing technique that may be 3-D printing. The material may be a metal, including aluminum, steel, brass, cooper, iron, stainless steel, titanium, an alloy, or the like. Alternatively, the material may be a plastic, ceramic, etc. that provides the tensile strength and resistance to wear as required for a piston cooling jet. In one example, the material is a combination of an adhesive and a powdered metal that may be sintered, or heated with a laser, or in an oven to form the housing accordingly. The build plate includes a flat surface for receiving the first layer. Alternatively, a stasis field may be formed to hold the housing being formed in place instead of using a build plate.

At 204, successive layers of material are deposited onto the first layer. The first layer and the successive layers of the material may also be deposited to form vertical supports between the conduit and the build plate. In particular, the form of the piston cooling jet may be formed on the build plate.

At 206, optionally, a conduit formed from a non-additive manufacturing process may be added. In particular, the layers may be deposited around and on the added conduit. Thus, while an entire piston cooling jet housing may be formed using an additive process, alternatively, one or more components of the piston cooling jet housing may be formed using a different manufacturing process, and coupled to the housing during an additive manufacturing process. As a result, lower complexity, and cost components may be formed using an alternative manufacturing process, while the more complex portions of a housing are formed using the additive process. As a result, cost may be minimized.

At 208, sintering of the layers of material occurs to form the piston cooling jet. The sintering may occur using a laser, in a sintering oven, or the like. In one embodiment, within the sintering oven, the layers are heated to near melting temperature. At this temperature, bonds for between the metallic powder grains, forming a stronger bond than brazed components.

In one example, a housing may be formed that includes an elongated conduit, an inlet, and an interior chamber. The elongated conduit may be a channel that is fluidly coupled with the interior chamber and extends to a nozzle through which fluid is directed out of the housing. Specifically, the fluid is received via the inlet into the interior chamber. The elongated conduit may include at least one bend, an arcuate portion, or the like. Still, the housing is formed as a single piece continuous construction in a single manufacturing step without the need to press fit or braze components together. To this end, the first layer and the successive layers of the material may be deposited to form the conduit projecting from the housing at a downward angle toward the build plate and having a bend that angles the nozzle at an upward angle away from the build plate.

Figure 3:
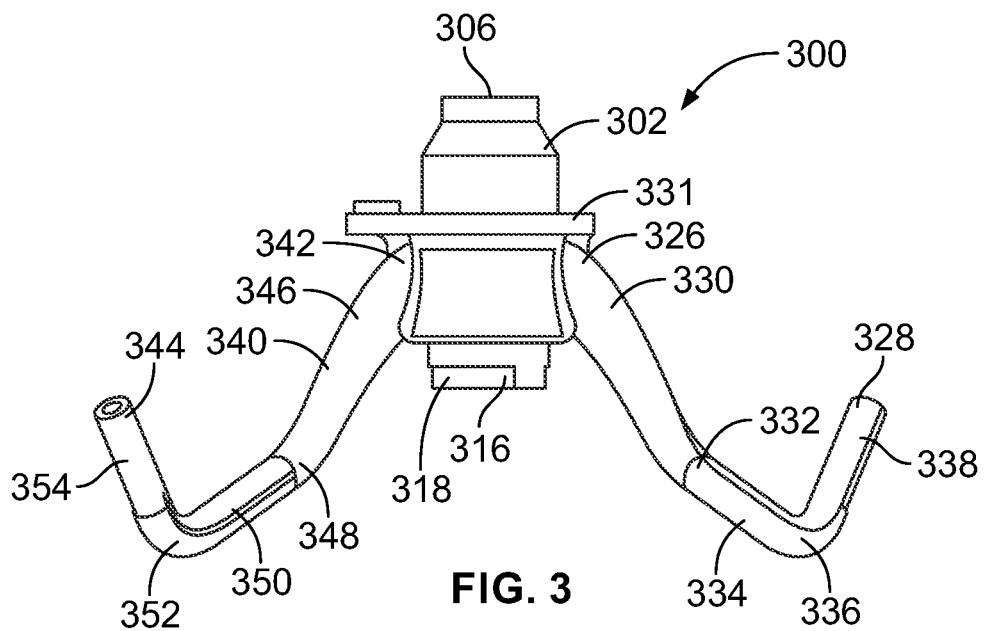
FIG. 3 illustrates a perspective view of a piston cooling jet.
Figure 4:
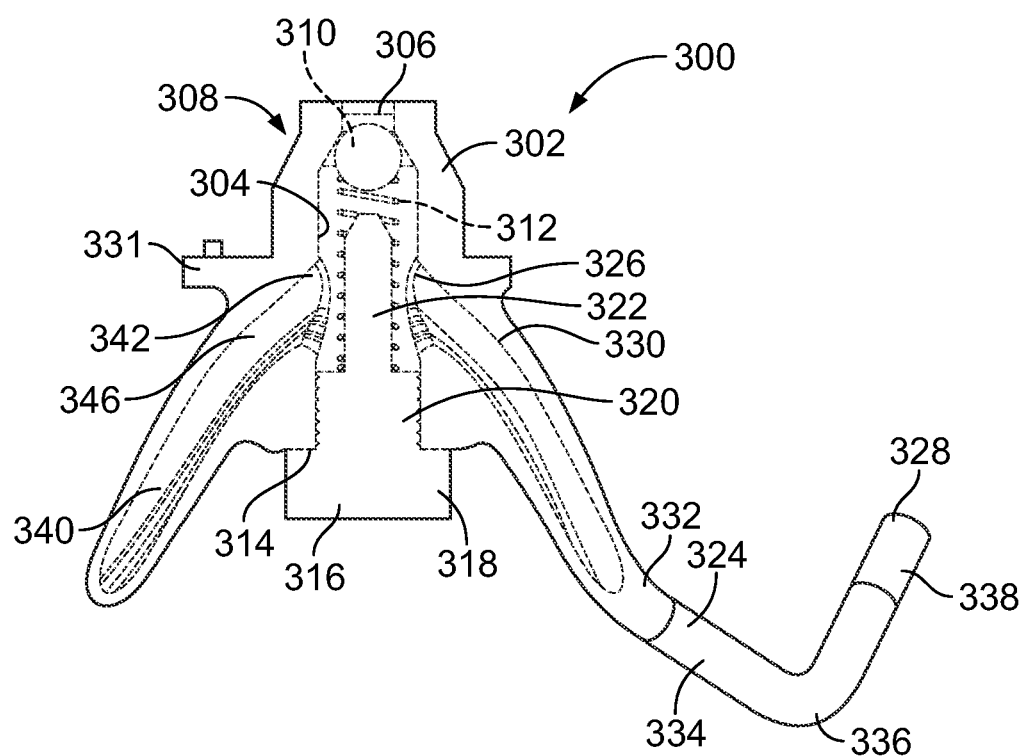
FIG. 4 illustrates a perspective view with hidden lines of a piston cooling jet.

FIGS. 3-4 illustrate an example piston cooling jet 300. In one example, the piston cooling jet is made from the process as described in relation to FIG. 2. The piston cooling jet includes a housing 302 that may be of one-piece and continuous construction. By using an additive manufacturing process, the housing may be formed in a single manufacturing process, without the need to press fit or braze individual components together. By being of one-piece construction, the chemical formula, consistency, or the like of the material of the housing is the same. In particular, the particles, molecules, etc. of the material may be integrated such that the housing is formed of a single material. The housing includes an interior chamber 304 that receives fluid at an inlet 306 from an external source (not shown). A valve assembly 308 may be provided to control fluid flow through the inlet. In one embodiment, the valve assembly includes a ball 310 that is biased against the inlet by a resilient member 312. In one example, the resilient member may be a spring.

The ball when biased against the inlet prevents the flow of fluid through the inlet. The resilient member provides a biasing force that must be overcome by fluid flowing from the external source to push the ball away from the inlet, allowing the flow of the fluid through the inlet.

A fastener opening 314 is provided at the opposite side of the interior chamber from the inlet. The fastener opening receives a guide pin 316 that is movably coupled within the fastener opening. In one example, the guide pin and fastener opening include corresponding threads to allow the guide pin to be threadably coupled into the fastener opening. By being movable within the fastener opening, the guide pin may be moved towards and away from the inlet to adjust the biasing force of the resilient member. When moved toward the inlet, the biasing force is increased, while when moved away from the inlet, the biasing force is decreased. In this manner, the rate at which the fluid enters the interior chamber of the housing through the inlet may be controlled by adjusting the guide pin and directly related to the length of the guide pin. In one example the guide includes a head 318, threaded portion 320, and a stem 322, and the resilient member surrounds the stem and engages and is pushed by the threaded portion. The head meanwhile functions as a grip for an individual or tool to engage to provide the desired rotation and setting.

A first conduit 324 is coupled with the housing and fluidly coupled with the interior chamber. The first conduit generally has a bent shape to direct the fluid from the interior chamber of the housing toward and underside of an engine piston head. The first conduit may extend from a first end 326 to a second end 328 where in one example the diameter of the first end may be greater than the diameter at the second end. To this end, extending from the first end may be a tapered portion 330 that has a first arcuate transition 332 to a straight portion 334. By thickening the conduit at the coupling with the interior chamber, the conduit has increased stiffness at the coupling, allowing for the elimination of additional support members. Additionally, the tapered portion may extend from a flange 331 of the housing at a 45° angle to increase strength, instead of having bends that reduce strength and add manufacturing complexities. Thus, manufacturing time and cost is saved.

The straight portion may then extend to a second arcuate transition 336 that may curve at a greater rate than the first arcuate transition. Extending from the second arcuate transition is an outlet nozzle 338 where fluid is dispelled from the piston cooling jet onto a piston head. The shape of the first conduit may include a combination of functional and ornamental features. For example, the first and second arcuate transitions may be provided to fit within the geometry of the engine, and ensure the thermal management fluid is dispelled from the first conduit in a determined position, and fluid speed. Still, the geometry of engines may allow for ornamental features and curving, for a more aesthetically appealing piston cooling jet.

A second conduit 340 is also coupled with the housing and fluidly coupled with the interior chamber. The second conduit generally has a bent shape to direct the fluid from the interior chamber of the housing toward and underside of an engine piston head. The second conduit may extend from a first end 342 to a second end 344 where in one example the diameter of the first end may be greater than the diameter at the second end. To this end, extending from the first end may be a tapered portion 346 that has a first arcuate transition 348 to a straight portion 350. By thickening the conduit at the coupling with the interior chamber, the conduit has increased stiffness at the coupling, allowing for the elimination of additional support members. Additionally, the tapered portion may extend from a flange 331 of the housing at a 45° angle to increase strength, instead of having bends that reduce strength and add manufacturing complexities. Thus, manufacturing time and cost is saved.

The straight portion may then extend to a second arcuate transition 352 that may curve at a greater rate than the first arcuate transition. Extending from the second arcuate transition is an outlet nozzle 354 where fluid is dispelled from the piston cooling jet onto a piston head. The shape of the second conduit may include a combination of functional and ornamental features. For example, the first and second arcuate transitions may be provided to fit within the geometry of the engine, and ensure the thermal management fluid is dispelled from the first conduit in a determined position, and fluid speed. Still, the geometry of engines may allow for ornamental features and curving, for a more aesthetically appealing piston cooling jet.

FIG. 5 illustrates an example nozzle 500 of a conduit of the piston cooling jet. In one example, the nozzle of FIG. 5 is either one of, or both nozzles of the first and second conduits of FIG. 4. Each nozzle may be positioned to straighten flow of the fluid exiting from the conduit via an outlet 502 of the nozzle toward the underside of the engine piston head. The flow straightening nozzle may also have internal intersecting walls 504 that intersect along a direction of the flow of the fluid in the conduit and out of the flow straightening nozzle. In one example, the intersecting walls may be orthogonally oriented with respect to each other, and may also be disposed upstream of the outlet. In another example, the intersecting walls may extend along the direction of the flow of the fluid over a length that is shorter than a distance that an end of the intersecting walls is located from the outlet of the nozzle along the direction of the flow of the fluid.

The nozzle may also include an internal channel 506 that is fluidly coupled with the nozzle, the internal channel having a tapered section 508 that is tapered along the direction of the flow of the fluid. To this end, the intersecting walls may be located upstream of the tapered section of the channel in the nozzle along the direction of the flow of the fluid. As a result of the flow straightening nozzle, flow laminarity of the cooling jet piston is provided, reducing divergence.

FIG. 6 illustrates another embodiment of a piston cooling jet 600. In this embodiment, the piston cooling jet is shown just after an additive process has been used to form the housing 602 on a build plate 604. In one example, more than one piston cooling jet may be formed on a single build plate. In the illustration, an exterior of a housing 602 is provided showing the inlet 606, flange 608 and a first and second conduits 610, (not shown). In addition, plural vertical supports 614 may be provided between the conduits and the build plate to facilitate the manufacturing process. The vertical supports may be built in an orientation that reduces distortion, minimizes the number of vertical supports needed, reduces the need for internal supports, and facilitates removal of the piston cooling jet from the build plate. To this end, the build direction of the additive process may also provide enhanced nozzle geometry, further reducing costs.

FIGS. 7-14 all illustrate alternative embodiments of a piston cooling jet. In each embodiment, the housing may be formed using an additive process as described herein. In each embodiment, a different valve arrangement may be provided within the housing. Still, by using the additive process in forming the housing, manufacturing time is saved, cost reduced, and strength increased.

FIG. 7 illustrates an embodiment of a piston cooling jet 700 that includes a housing 702 that receives a poppet valve 704. The poppet valve includes an inlet 706 that engages a seat 708 until pressure on the inlet creates a force on a poppet 710, pushing it off the seat to permit flow through outlets 712. The poppet valve, similar to the valve of FIGS. 3-4, may be threadably secured within the housing, and also has a head 714 for gripping and rotating. The poppet valve results in low leakage, while the housing allows insertion of the poppet valve.

Figure 8:
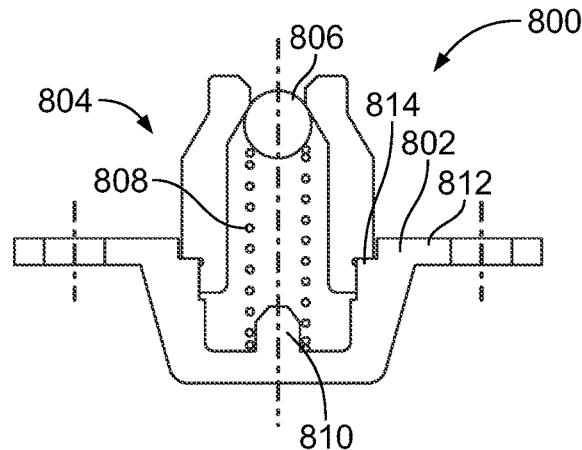
FIG. 8 illustrates a sectional view of a piston cooling jet.

FIG. 8 illustrates an embodiment of a piston cooling jet 800 that includes a housing 802 that receives a valve 804 similar to the valve assembly of FIGS. 3 and 4 that uses a ball 806, resilient member 808, and a guide pin 810. In the embodiment, instead of threading the valve assembly into the housing, the valve assembly may be press fit. In this example press fit, the flange 812 of the housing includes a seat 814 for receiving the valve assembly.

Figure 9:
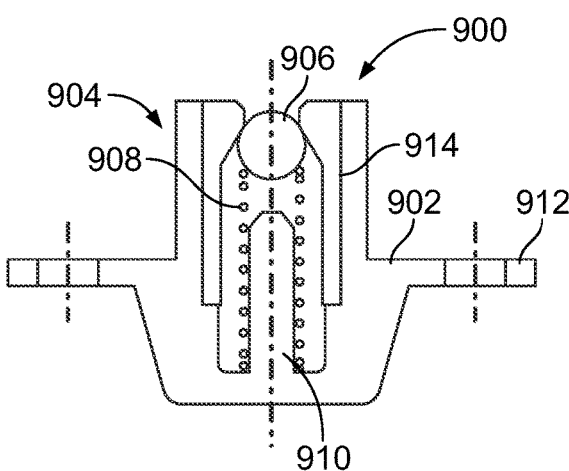
FIG. 9 illustrates a sectional view of a piston cooling jet.

FIG. 9 illustrates an embodiment of a piston cooling jet 900 that includes a housing 902 that receives a valve 904 similar to the valve assembly of FIGS. 3 and 4 that uses a ball 906, resilient member 908, and a guide pin 910. In the embodiment, instead of threading the valve assembly into the housing, the valve assembly again may be press fit. In this example press fit, the flange 912 of the housing includes an annular opening 914 for receiving the valve assembly.

Figure 10:
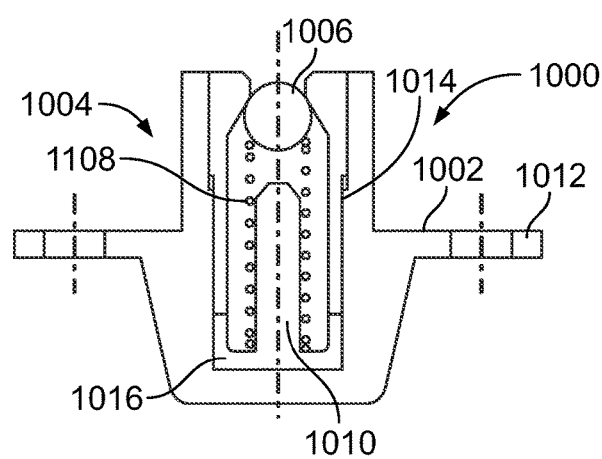
FIG. 10 illustrates a sectional view of a piston cooling jet.

FIG. 10 illustrates an embodiment of a piston cooling jet 1000 that includes a housing 1002 that receives a valve 1004 similar to the valve assembly of FIGS. 3 and 4 that uses a ball 1006, resilient member 1008, and a guide pin 1010. In the embodiment, instead of threading the valve assembly into the housing, the valve assembly again may be press fit. In this example press fit, the flange 1012 of the housing includes an annular opening 1014 for receiving the valve assembly, similar to the embodiment of FIG. 9. In the embodiment of FIG. 10, a spring locator 1016 is disposed within the annular opening for looking the resilient member.

Figure 11:
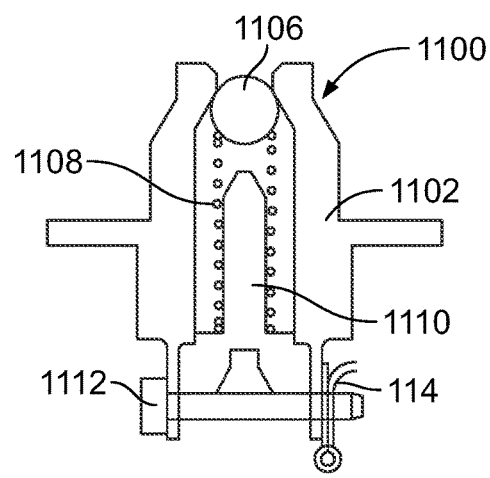
FIG. 11 illustrates a sectional view of a piston cooling jet.

FIG. 11 illustrates an embodiment of a piston cooling jet 1100 that includes a housing 1102 that receives a valve 1104 similar to the valve assembly of FIGS. 3 and 4 that uses a ball 1106, resilient member 1108, and a guide pin 1110. In the embodiment, instead of threading the valve assembly into the housing, or a press fit, a machined pin 1112 with a cotter pin 1114 may be used to secure the guide pin.

Figure 12:
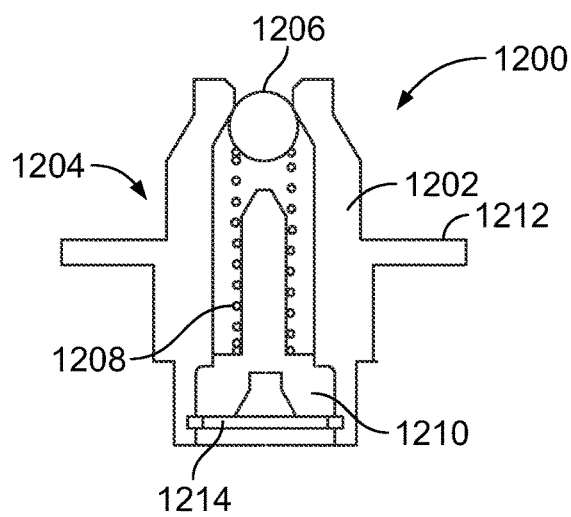
FIG. 12 illustrates a sectional view of a piston cooling jet.

FIG. 12 illustrates an embodiment of a piston cooling jet 1200 that includes a housing 1202 that receives a valve 1204 similar to the valve assembly of FIGS. 3 and 4 that uses a ball 1206, resilient member 1208, and a guide pin 1210. In the embodiment, instead of threading the valve assembly into the housing, using a press fit, or cotter pin, the valve assembly, the flange 1212 of the housing may include a circlip retainer 1214.

Figure 13:
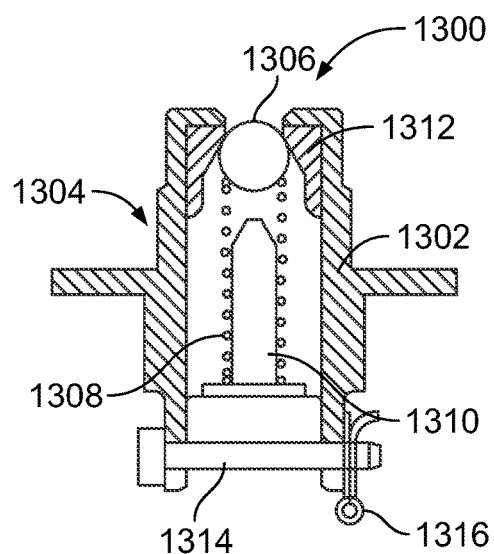
FIG. 13 illustrates a sectional view of a piston cooling jet.

FIG. 13 illustrates an embodiment of a piston cooling jet 1300 that includes a housing 1302 that receives a valve 1304 similar to the valve assembly of FIGS. 3 and 4 that uses a ball 1306, resilient member 1308, and a guide pin 1310. In the embodiment, a press fitted seat 1312 may be provided for the ball, and a machined pin 1314 with a cotter pin 1316 may secure the guide pin therein.

Figure 14:
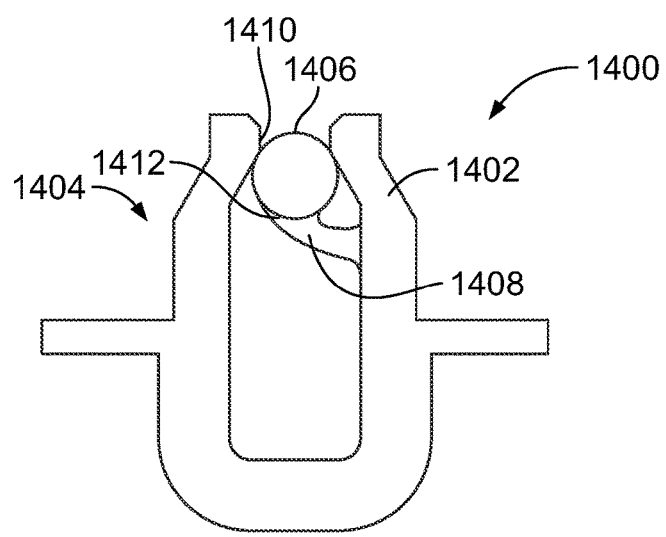
FIG. 14 illustrates a sectional view of a piston cooling jet.

FIG. 14 illustrates an embodiment of a piston cooling jet 1400 that includes a housing 1402 that receives a valve 1404 similar to the valve assembly of FIGS. 3 and 4 that uses a ball 1406 and a resilient member 1408. In this embodiment, the resilient member may be a cantilevered beam that extends from an interior surface of the housing and towards the inlet 1410. The cantilevered beam may have the ball on an outer end 1412, and moves downwardly when a threshold pressure is reached to allow fluid into the inlet of the housing. In this manner, the cantilevered beam and ball are positioned to control the rate at with fluid enters the interior chamber of the housing.

In the example of FIG. 14, the cantilevered beam and ball are a single-piece that may be formed during an additive manufacturing process. Because the cantilevered beam is manufactured during the additive process, the opposite side of the housing to the inlet may be closed, eliminating the need for the guide pin and corresponding seals into the internal chamber 1414.

In one or more embodiments, a piston cooling jet is provided that may include a housing having an interior chamber that receives a fluid from an external source, and a conduit coupled with the housing and fluidly coupled with the interior chamber, the conduit having a bent shape to direct the fluid from the interior chamber of the housing toward an underside of an engine piston head. The piston cooling jet may also include a flow straightening nozzle coupled with the conduit and positioned to straighten flow of the fluid exiting from the conduit via the nozzle toward the underside of the engine piston head, the flow straightening nozzle having internal intersecting walls that intersect along a direction of the flow of the fluid in the conduit and out of the flow straightening nozzle.

Optionally, the intersecting walls may be orthogonally oriented with respect to each other. In another aspect, the nozzle may extend from the conduit to an outlet and the intersecting walls may be disposed in the nozzle upstream of the outlet. In one embodiment, the intersecting walls may extend along the direction of the flow of the fluid over a length that is shorter than a distance that an end of the intersecting walls is located from the outlet of the nozzle along the direction of the flow of the fluid.

Optionally, the nozzle may include an internal channel that is fluidly coupled with the nozzle, the internal channel having a tapered section that is tapered along the direction of the flow of the fluid. In another aspect, the intersecting walls may be located upstream of the tapered section of the channel in the nozzle along the direction of the flow of the fluid. In one example, the housing and the conduit may be a single, continuous body.

In another aspect, the housing may include an inlet and an opposite fastener opening on opposite sides of the interior chamber. The housing may be configured to hold a ball and a resilient member in the interior chamber and to receive a guide pin into the interior chamber via the fastener opening. The resilient member and the ball may also be configured to control a rate at which the fluid enters into the interior chamber of the housing via the inlet of the housing. In one example, the guide pin may have a length that controls the rate at which the fluid enters into the interior chamber of the housing.

Optionally, the housing may include an inlet through which the fluid is received into the housing. The housing may also include a cantilevered beam extending from an interior surface of the housing toward the inlet. The cantilevered beam may have a ball on an outer end of the cantilevered beam, and the cantilevered beam and the ball may be positioned to control a rate at which the fluid enters into the interior chamber of the housing. In another aspect, the housing, the cantilevered beam, and the ball may be a single body. In another example, the conduit may be elongated and extends from an exterior surface of the housing at a non-orthogonal angle. In yet another aspect, the conduit may include only a single bend at an angle greater than forty-five degrees.

Optionally, the piston cooling jet may also include a planar flange coupled with the housing and configured to be coupled with a cylinder block of an engine. In one aspect, the housing and the flange may be a single body. In another aspect, the housing and the flange may be separate bodies that are one or more of threaded together, press-fit together, held together by a cotter pin, or held together by a circlip.

In one or more embodiments, piston cooling jet is provided that may include a single body housing and conduit. The housing may have an interior chamber that receives a fluid from an external source, and the conduit may be coupled with the housing and fluidly coupled with the interior chamber. The conduit may have a bent shape to direct the fluid from the interior chamber of the housing toward an underside of an engine piston head. The piston cooling jet may also include a nozzle coupled with the conduit and positioned to direct flow of the fluid exiting from the conduit via the nozzle toward the underside of the engine piston head.

Optionally, the conduit may be elongated and extends from an exterior surface of the housing at a non-orthogonal angle. In one example, the conduit may include only a single bend at an angle greater than forty-five degrees. In one aspect, the housing and the conduit may be a single, continuous body. In another aspect, the nozzle may be a flow straightening nozzle having internal intersecting walls that intersect along a direction of the flow of the fluid in the conduit and out of the flow straightening nozzle. In an example, the intersecting walls may be orthogonally oriented with respect to each other. Alternatively, the nozzle may extend from the conduit to an outlet and the intersecting walls are disposed in the nozzle upstream of the outlet. In yet another example, the intersecting walls may extend along the direction of the flow of the fluid over a length that is shorter than a distance that an end of the intersecting walls is located from an outlet of the nozzle along the direction of the flow of the fluid. In another aspect, the channel may include a tapered section and the intersecting walls are located upstream of the tapered section of the channel in the nozzle along the direction of the flow of the fluid.

Optionally, the nozzle may include an internal channel that is fluidly coupled with the nozzle, the internal channel having a tapered section that is tapered along the direction of the flow of the fluid. In one aspect, the housing includes an inlet and an opposite fastener opening on opposite sides of the interior chamber, the housing configured to hold a ball and a resilient member in the interior chamber and to receive a guide pin into the interior chamber via the fastener opening. The resilient member and the ball may be configured to control a rate at which the fluid enters into the interior chamber of the housing via the inlet of the housing. In another aspect, the guide pin has a length that controls the rate at which the fluid enters into the interior chamber of the housing.

Optionally, the piston cooling jet may also include a planar flange that may couple with the housing and may also be configured to be coupled with a cylinder block of an engine. In another aspect, the housing, the conduit, and the flange may be a single body. In another aspect, the housing and the flange may be separate bodies that are one or more of threaded together, press-fit together, held together by a cotter pin, or held together by a circlip. In yet another example, the housing may include an inlet through which the fluid may be received into the housing, the housing also including a cantilevered beam extending from an interior surface of the housing toward the inlet. The cantilevered beam may have a ball on an outer end of the cantilevered beam, and the ball may be positioned to control a rate at which the fluid enters into the interior chamber of the housing. In one aspect, the housing, the cantilevered beam, and the ball may be a single body.

In one or more embodiments, a method may be provided for depositing a first layer of material for a piston cooling jet onto a build plate, the piston jet including a housing and an elongated conduit. The housing may have an inlet and an interior chamber into which a fluid is received via the inlet, and the conduit may have a channel that is fluidly coupled with the interior chamber of the housing and that extends to a nozzle through which the fluid is directed out of the piston cooling jet. The method may also include depositing successive layers of the material onto the first layer to additively form the piston cooling jet. The first layer and the successive layers of the material may be deposited to form the conduit projecting from the housing at a downward angle toward the build plate and having a bend that angles the nozzle at an upward angle away from the build plate. The first layer and the successive layers of the material may be deposited to form vertical supports between the conduit and the build plate. Optionally, the method also includes sintering the first layer and the successive layers of the material to form the piston cooling jet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:
1. A piston cooling jet comprising:
a housing having an interior chamber that receives a fluid from an external source;
a conduit coupled with the housing and fluidly coupled with the interior chamber, the conduit having a bent shape to direct the fluid from the interior chamber of the housing toward an underside of an engine piston head;

the conduit having a tapered portion extending from the interior chamber, the tapered portion having a first arcuate transition to a straight portion of the conduit and a nozzle coupled with the conduit and positioned to straighten flow of the fluid exiting from the conduit via the nozzle toward the underside of the engine piston head, the nozzle having internal intersecting walls that intersect along a direction of the flow of the fluid in the conduit and out of the nozzle;

wherein the intersecting walls of the nozzle are orthogonally oriented with respect to each other.

2. The piston cooling jet of claim 1, wherein the nozzle extends from the conduit to an outlet and the intersecting walls are disposed in the nozzle upstream of the outlet, and the intersecting walls extend along the direction of the flow of the fluid over a length that is shorter than a distance that an end of the intersecting walls is located from the outlet of the nozzle along the direction of the flow of the fluid.

3. The piston cooling jet of claim 1, wherein the nozzle includes an internal channel that is fluidly coupled with the nozzle, the internal channel having a tapered section that is tapered along the direction of the flow of the fluid, and the intersecting walls are located upstream of the tapered section of the internal channel in the nozzle along the direction of the flow of the fluid.

4. The piston cooling jet of claim 1, wherein the interior chamber and the conduit of the housing are a single, continuous body that is of one-piece construction.

5. The piston cooling jet of claim 1, wherein the housing includes an inlet and an opposite fastener opening on opposite sides of the interior chamber, the housing configured to hold a ball and a resilient member in the interior chamber and to receive a guide pin into the interior chamber via the fastener opening, the resilient member and the ball configured to control a rate at which the fluid enters into the interior chamber of the housing via the inlet of the housing, and the guide pin has a length that controls the rate at which the fluid enters into the interior chamber of the housing.

6. The piston cooling jet of claim 1, wherein the housing includes an inlet through which the fluid is received into the housing, the housing also including a cantilevered beam extending from an interior surface of the housing toward the inlet, the cantilevered beam having a ball on an outer end of the cantilevered beam, the cantilevered beam and the ball positioned to control a rate at which the fluid enters into the interior chamber of the housing.

7. The piston cooling jet of claim 6, wherein the housing, the cantilevered beam, and the ball are a single body.

8. The piston cooling jet of claim 1, wherein the conduit is elongated and extends from an exterior surface of the housing at a non-orthogonal angle.

9. The piston cooling jet of claim 1, further comprising a planar flange coupled with the housing and configured to be coupled with a cylinder block of an engine, wherein the housing and the planar flange are a single body.

10. A piston cooling jet comprising:

a single body housing and conduit, the single body housing having an interior chamber that receives a fluid from an external source, the conduit coupled with the single body housing and fluidly coupled with the interior chamber, the conduit having a bent shape to direct the fluid from the interior chamber of the single body housing toward an underside of an engine piston head; and a nozzle coupled with the conduit and positioned to direct flow of the fluid exiting from the conduit via the nozzle toward the underside of the engine piston head.

11. The piston cooling jet of claim 10, wherein the conduit is elongated and extends from an exterior surface of the single body housing at a non-orthogonal angle.

12. The piston cooling jet of claim 10, wherein the conduit includes only a single bend at an angle greater than forty-five degrees.

13. The piston cooling jet of claim 10, wherein the nozzle is a flow straightening nozzle having internal intersecting walls that intersect along a direction of the flow of the fluid in the conduit and out of the flow straightening nozzle.

14. The piston cooling jet of claim 10, wherein the nozzle includes an internal channel that is fluidly coupled with the nozzle, the internal channel having a tapered section that is tapered along a direction of the flow of the fluid.

15. The piston cooling jet of claim 10, wherein the single body housing includes an inlet and an opposite fastener opening on opposite sides of the interior chamber, the single body housing configured to hold a ball and a resilient member in the interior chamber and to receive a guide pin into the interior chamber via the opposite fastener opening, the resilient member and the ball configured to control a rate at which the fluid enters into the interior chamber of the single body housing via the inlet of the single body housing.

16. The piston cooling jet of claim 10, further comprising a planar flange coupled with the single body housing and configured to be coupled with a cylinder block of an engine.

17. The piston cooling jet of claim 10, wherein the single body housing includes an inlet through which the fluid is received into the single body housing, the single body housing also including a cantilevered beam extending from an interior surface of the single body housing toward the inlet, the cantilevered beam having a ball on an outer end of the cantilevered beam, the cantilevered beam and the ball positioned to control a rate at which the fluid enters into the interior chamber of the single body housing.

18. A piston cooling jet comprising:

a housing having an interior chamber that is configured to receive a fluid from an external source;

the housing also having a cantilevered beam with a ball on an outer end of the cantilevered beam, the cantilevered beam and the ball positioned to control a rate at which the fluid enters into the interior chamber of the housing;

a conduit coupled with the housing to provide a single body, and fluidly coupled with the interior chamber, the conduit having a bent shape to direct the fluid from the interior chamber of the housing toward an underside of an engine piston head; and a flow straightening nozzle coupled with the conduit and positioned to straighten flow of the fluid exiting from the conduit via the flow straightening nozzle toward the underside of the engine piston head, the flow straightening nozzle having internal intersecting walls that intersect along a direction of the flow of the fluid in the conduit and out of the flow straightening nozzle.

19. The piston cooling jet of claim 18, further comprising a planar flange coupled with the housing and configured to be coupled with a cylinder block of an engine, wherein the housing and the flange are a single body.

20. The piston cooling jet of claim 18, wherein the internal intersecting walls are orthogonally oriented with respect to each other.

* * * * *